O. FORSBERG.
CARPENTER'S SQUARE.
APPLICATION FILED JUNE 26, 1915.
1,178,710.
Patented Apr. 11, 1916.
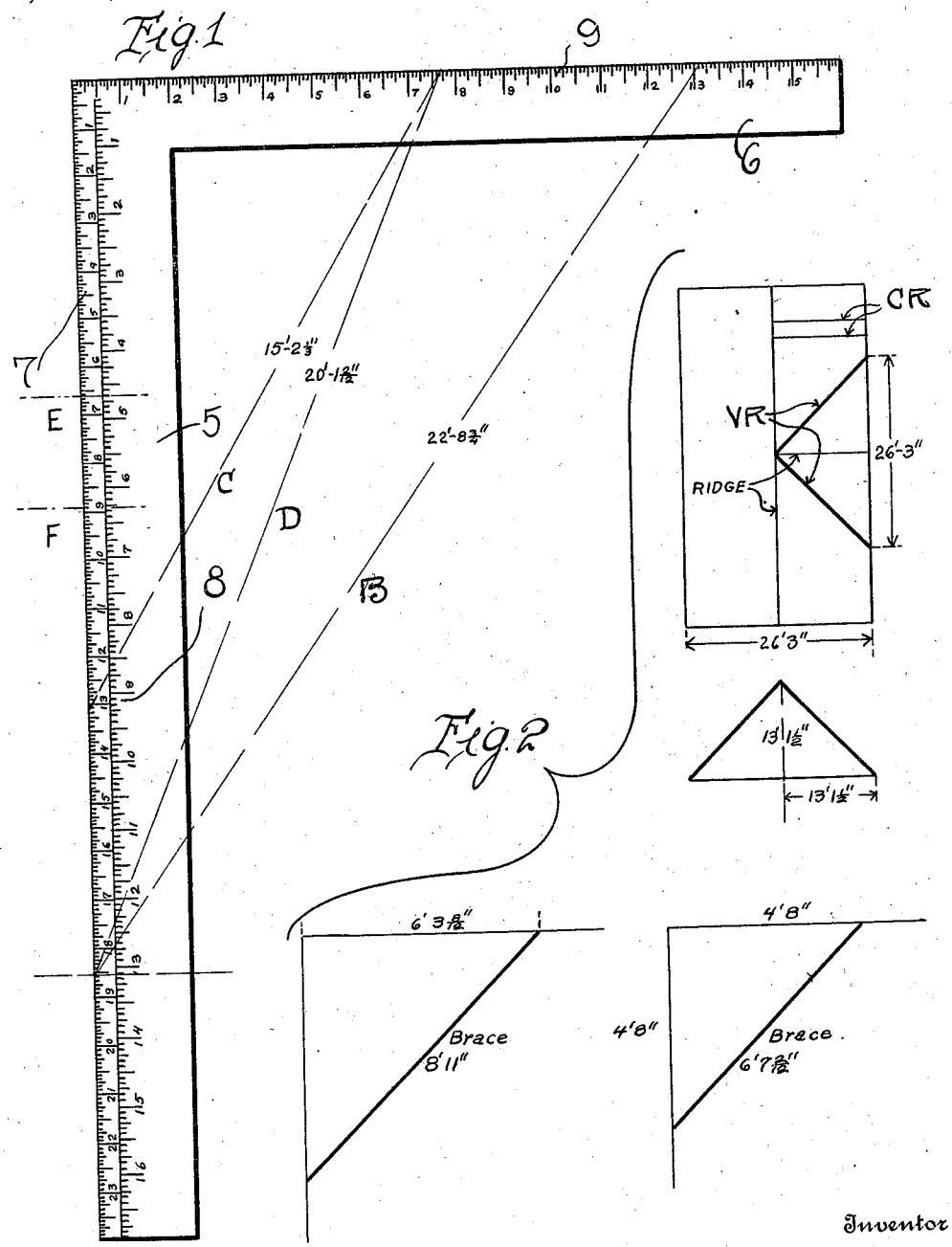
Witnesses
Robert M. Sutphen
A. D. Hurd
Inventor
O. Forsberg
By Watson E. Coleman
Attorney

UNITED STATES PATENT OFFICE.

OSCAR FORSBERG, OF YONKERS, NEW YORK.

CARPENTER'S SQUARE.

1,178,710.  Specification of Letters Patent.  Patented Apr. 11, 1916.

Application filed June 26, 1915. Serial No. 36,545.

*To all whom it may concern:*

Be it known that I, OSCAR FORSBERG, a citizen of the United States, residing at Nepperhan Heights, Yonkers, in the county of Westchester and State of New York, have invented certain new and useful Improvements in Carpenters' Squares, of which the following is a specification, reference being had to the accompanying drawings.

This invention relates to carpenters' squares, and has for its primary object to provide a square, the tongue and blade of which are provided with suitable scales, whereby the length of roof rafters of various kinds, may be determined.

The invention has for a further object to provide a relative arrangement of the scales upon the tongue and blade of the square whereby the actual determination of rafter lengths may be greatly facilitated and the necessity of making numerous calculations, obviated.

With the above and other objects in view, my invention consists in the novel features of construction, combination, and arrangement of parts to be hereinafter more fully described, claimed, and illustrated in the accompanying drawing, in which, Figure 1 is a plan view of my improved carpenter's square having imaginary lines laid off thereon to show the manner whereby the length of the several different kinds of roof rafters may be determined; and Fig. 2 illustrates several diagrams on which rafters employed for several different purposes are indicated.

Referring in detail to the drawing, 5 designates the long body blade of the square and 6 the relatively short tongue which extends from one end of the blade at right angles thereto. The outer edge of the blade 5 is graduated to provide a scale 7, graduated in inches and twelfths thereof to represent feet and inches. The outer edge of the tongue 6 is also provided with a scale indicated at 9, the graduations thereof also representing feet and inches.

A second longitudinal scale 8 is provided upon the blade 5 which bears the same relation to either of the scales 7 or 9 that the diagonal of a square does to its sides, and is adapted for use only in laying out square pitched roofs.

Having above described the several features of the combined carpenter's square and scale, I shall now set forth several ways in which the same may be advantageously employed.

Referring to the diagram in Fig. 2, showing the plan of a roof, when it is desired to determine the length of the common rafters indicated by the letters C. R., for a roof having a rise or height of 13′, 1½″, this measurement of 13′, 1½″ is laid off on the scale 8 of the square blade 5 and projected through the scale 7 which will give a reading of 18′, 6¾″, which will be the true length of the common rafters.

To determine the necessary length of the valley rafters, indicated in the diagram by the letters V. R., the 13′, 1½″ measurement is laid off on the scale 9 of the tongue 6 and a separate scale, indicated at B, extending from this point on the scale 9 to the 18′, 6¾″ graduation on the scale 7 of the square blade, will give a reading of 22′, 8¾″ which is the true length of the valley rafters. It is, of course, understood that the separate scale for taking these measurements from the blade and tongue of the square is properly graduated.

Assuming that the rise or height of the roof is 7′, 8½″ instead of 13′, 1½″, the run being 13′, 1½″, this measurement is laid off on the scale 7, the graduations thereon being read as feet and inches, while the 7′, 8½″ measurement is laid off on the scale 9 of the tongue 6. A scale laid upon the blade and tongue of the square and connecting these two points, will give a measurement of 15′, 2⅓″ as indicated at C, which is the length of the common rafters for a roof of this height.

To find the length of the valley rafters for a roof having a rise of 7′, 8½″, from this point on the tongue 6 to the 13′, 1½″ graduation on the scale 8 projected through the scale 7 on the edge of the square blade, the separate scale indicated at D will give a measurement of 20′, 1 2/12″, which is the desired length of the valley rafters.

In order to determine the necessary length of braces between two beams of a triangular-shaped figure, the same are read upon the scales 7 and 8. For instance, assuming, as shown in one of the diagrams in Fig. 2, that two sides of the triangle which are known each measures 4′, 8″, and it is desired to ascertain the necessary length of a bracing beam to connect the ends of these two sides, the measurement 4′, 8″ on the inner scale 8 projected through the scale 7 on the outer edge of the blade 5, as indicated at E, which will give a reading of 6′, 7$\frac{2}{12}$″, which is the necessary length of the brace. Again, assuming that the length of the brace be given as 8′, 11″ and it is desired to determine the length of the other two sides of the triangle which are to be equal, the measurement 8′, 11″ is laid off on the scale 7 and projected through the scale 8 as indicated at F, which will give a reading of 6′, 3$\frac{8}{12}$″ on the latter scale, or the necessary length for the other two pieces.

From the above description, it is believed that the manner of using my improved scale in roof construction will be clearly and fully understood.

It is, of course, obvious that the above are only given as examples and the device may be employed for various other analogous uses.

The graduations for the several scales being marked directly upon the blade and tongue on the carpenter's square, it is apparent that the calculations may be very easily and quickly made without requiring the handling of a number of rules.

The invention is also very convenient and serviceable in practical use and it is, of course, apparent that the same can be produced at only slightly greater cost than that incident to the manufacture of the square itself.

Having thus fully described my invention, what I desire to claim and secure by Letters Patent is:—

1. A square having a blade and tongue, said blade being provided upon its outer edge with a scale indicative of common rafter lengths for various roof constructions and also provided with a second scale upon which the rise of the roof is adapted to be laid off, the length of the common roof rafter for a roof having a given rise being determined by projecting the graduation on the latter scale corresponding to such rise on to the first named scale.

2. A square having a blade and tongue, said blade being provided with two longitudinally extending scales having their graduations at relatively different distances apart and each being indicative of feet and fractional parts thereof, the rise of a roof being adapted to be laid off on one of said scales by the projection of the graduation corresponding to such rise onto the other scale, the reading on said latter scale indicating the necessary length of the common roof rafters.

3. A square having a blade and tongue, said blade being provided with two longitudinally extending scales having their graduations at relatively different distances apart and each being indicative of feet and fractional parts thereof, the run of a roof rafter being adapted to be laid off on one of said scales and projected onto the other of the scales, the reading on said latter scale indicating the necessary length of the common roof rafters or the run of the valley rafter, said tongue being also provided with a longitudinally extending scale graduated to indicate feet and fractional parts thereof and upon which the rise is adapted to be laid off, the distance between the graduation giving the run of the valley rafter and that on the tongue corresponding to such rise giving the length of said valley rafter.

In testimony whereof I hereunto affix my signature in the presence of two witnesses.

OSCAR FORSBERG.

Witnesses:
SWAN KNUTSON,
VITALIS JOHNSON.

Copies of this patent may be obtained for five cents each, by addressing the "Commissioner of Patents, Washington, D. C."